(12) United States Patent
Penmetcha et al.

(10) Patent No.: US 12,348,793 B2
(45) Date of Patent: Jul. 1, 2025

(54) PRODUCT METRICS MONITORING AND ANOMALY DETECTION USING MACHINE LEARNING MODELS

(71) Applicant: Roku, Inc., San Jose, CA (US)

(72) Inventors: Suvrath V. Penmetcha, Mountain View, CA (US); Le Zhang, San Jose, CA (US); Vijay Anand Raghavan, Newton, MA (US); Beth Teresa Logan, Cambridge, MA (US); Kevin Henely, San Francisco, CA (US); Sahib Bal, San Jose, CA (US); Sayan Maity, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 309 days.

(21) Appl. No.: 17/652,875

(22) Filed: Feb. 28, 2022

(65) Prior Publication Data

US 2023/0276080 A1 Aug. 31, 2023

(51) Int. Cl.
*H04N 21/226* (2011.01)
*G06F 18/21* (2023.01)
*G06N 5/01* (2023.01)

(52) U.S. Cl.
CPC ......... *H04N 21/226* (2013.01); *G06F 18/217* (2023.01); *G06N 5/01* (2023.01)

(58) Field of Classification Search
CPC ....... H04N 21/226; G06F 18/217; G06N 5/01
See application file for complete search history.

(56) References Cited

U.S. PATENT DOCUMENTS

2007/0282628 A1 12/2007 Satterfield
2023/0119186 A1* 4/2023 O'Donoghue ........... G06N 3/08
706/21

OTHER PUBLICATIONS

Non-Final Office Action for U.S. Appl. No. 18/339,419 dated Oct. 1, 2024.

* cited by examiner

*Primary Examiner* — Jefferey F Harold
*Assistant Examiner* — Franklin S Andramuno
(74) *Attorney, Agent, or Firm* — McDonnell Boehnen Hulbert & Berghoff LLP

(57) ABSTRACT

A method may include determining a combination of values of attributes represented by reference data associated with computing devices by training a machine learning model based on an association between (i) respective values of the attributes and (ii) the computing devices entering a device state. The combination may be correlated with entry into the device state. The method may also include selecting a subset of the computing devices that is associated with the combination of values. The method may additionally include determining a first rate at which computing devices of the subset have entered the device state during a first time period and a second rate at which one or more computing devices associated with the combination have entered the device state during a second time period, and generating an indication that the two rates differ.

20 Claims, 6 Drawing Sheets

PRODUCT METRICS MONITORING AND ANOMALY DETECTION USING MACHINE LEARNING MODELS

BACKGROUND

A typical media presentation system operates to facilitate presentation of media content, such as video, audio, or multi-media content, to end users. An example of such a system could include client-side equipment positioned at customer premises and arranged to output and present media content on a user interface such as a display screen with an associated sound system, and server-side equipment arranged to serve media content to the client-side equipment for presentation.

By way of example, the client-side equipment could include a media presentation device such as a television (TV), monitor, tablet computer, or mobile phone, which could present the media content on a user interface. Further, the client-side equipment could include a media player such as an over-the-top (OTT) streaming media player, cable or satellite set top box, digital video recorder, disc player, gaming system, mobile phone, personal computer, audio/video receiver, or tuner, which could be integrated with or in local or network communication with the media presentation device and could output media content to the media presentation device for presentation on the user interface. And the server-side equipment could include a media server and/or head-end equipment, operated by an OTT provider (e.g., virtual multichannel video programming distributor (virtual MVPD)), cable or satellite TV provider, or the like, which could stream or otherwise deliver media content to the client-side equipment for presentation.

In operation, a user at the customer premises may control the client-side equipment, to cause the system to present a desired media-content item, such as a movie, TV show, or video game, among other possibilities, any of which might be locally-stored, broadcast, or on-demand, also among other possibilities. For instance, the media presentation system may present the user with an on-screen media-content selection menu, and the user may operate a remote control to navigate through that menu, to select a desired media-content item, and to direct the system to present the selected media-content item. In response, possibly through interaction between the client-side equipment and the server-side equipment, the client-side equipment could obtain and present the selected media-content item to the user. And the user may then enjoy presentation of that selected media-content item.

SUMMARY

Computing devices, such as media presentation devices, may operate by moving through a plurality of device states, such as those of a finite state machine model that represents operations of the computing devices. The plurality of computing devices states may include normal and abnormal device states. Normal device states may represent, for example, an intended and/or desirable functionality of a computing device, while the abnormal device states may represent, for example, erroneous, flawed, unintended, and/or undesirable behaviors of the computing device. For example, the abnormal device states may represent errors, failures, crashes, freezes, and/or buffering events (e.g., excessively long load times), among other possibilities.

The computing devices may be associated with a plurality of attributes. Respective values of the attributes may be indicative of properties of the computing devices and/or a context in which the computing devices are operating. For example, the attributes may define properties of a hardware component, an operating system, a software application, a firmware, a network connection, a configuration setting, a user account, a server with which communication is established, and/or other aspect of the computing device. In some cases, some attributes and/or some combinations of attribute values may be associated with computing devices entering one or more of the abnormal device states at an abnormal and/or unusual (e.g., above average) rate. Thus, identification of these attributes and/or combinations of values thereof may facilitate identification and resolution of a cause of the abnormal entry rate of the abnormal device states.

However, as the number of attributes and/or possible values of the attributes increases, it may become increasingly difficult and/or time-consuming to determine which attributes and/or combinations of attribute values cause the computing devices to enter abnormal states. Specifically, when the number of attributes and/or possible combinations of values thereof is sufficiently large, a brute-force approach (e.g., one based on iterating through different combinations and/or permutations of attribute values) to scanning for problematic attributes and/or combinations of attribute values may take too long to execute to be useful in a practical implementation. For example, when the completion time of the brute-force approach is on the order of days, the brute-force approach might not be suitable for use in a system where a targeted mean time to detection (MTTD) and/or a targeted mean time to recovery (MTTR) of a problem is on the order of hours.

Accordingly, a machine learning model may be used to facilitate and/or speed up identification of and/or monitoring for problematic attributes and/or combinations of values thereof. The machine learning model may be trained based on reference data that contains, but that might not explicitly indicate, an association between respective values of attributes of the computing devices and the computing devices entering one or more abnormal device states. The reference data may be generated by and collected from the computing devices, and may thus represent a historical performance log thereof. For example, the reference data may represent and/or may be used to determine, for each respective (e.g., unique) combination of attribute values of a plurality of possible combinations of attribute values, a rate (e.g., percentage or frequency) at which computing devices of a computing device subset associated with the respective combination of attribute values enter the one or more abnormal device states. This rate may be expressed numerically and/or categorically (e.g., with each category corresponding to a numerical range).

The machine learning model may be trained to approximate the numerical and/or categorical rate of abnormal device state entries based on the respective values of the attributes of a given computing device subset. During training, attributes and/or attribute values that are represented by the reference data, but that are not predictive of and/or correlated with entry into the abnormal device states, may be discarded. Thus, training of the machine learning model may be used to determine at least one combination of a plurality of attribute values that is correlated with and/or predictive of entry into at least one abnormal device state. The at least one combination determined by the machine learning model (which may be referred to as an inferred combination) may, due to some attributes and/or attribute values being discarded during training, differ from the combinations indicated by the reference data (which may be referred to as training combinations).

In some cases, the at least one combination determined by the machine learning model may represent an order (i.e., a ranking) of the attributes and/or attribute values, which may, for example, rank the attributes and/or attribute values of the combination from a top attribute that is most highly correlated with and/or predictive of abnormal device state entry to a bottom attribute that is least correlated with and/or predictive of abnormal devices state entry. Thus, when an abnormally and/or unusually high rate of abnormal device state entries is encountered in a subset of the computing devices, the ranking may indicate an order in which aspects of these computing devices could be considered and/or analyzed as part of a debugging process intended to reduce the rate of abnormal device state entries.

In some implementations, the machine learning model may be a white-box model that, after training, includes a human-interpretable structure and/or output that represents the at least one combination of attribute values and/or the ranking thereof. For example, the machine learning model may be a decision tree model, and the hierarchy and/or arrangement of the nodes thereof may be indicative of the combination and/or the ranking of the attribute values. For example, a root node of the decision tree model may represent the top attribute and/or values thereof that are determined to be most correlated with and/or predictive of entry into the one or more abnormal device states, leaf nodes of the decision tree model may represent bottom attributes and/or values thereof that are determined to be least correlated with and/or predictive of entry into the one or more abnormal device states, and/or intermediate nodes of the decision tree model may represent intermediate attributes and/or values thereof that are determined to have intermediate extents of correlation and/or predictive capacity of entry into the one or more abnormal device states.

The at least one combination of the attribute values determined by the machine learning model may be used for grouping/partitioning the computing devices into subsets and for monitoring the rates with which these subsets enter abnormal device states. Each respective computing device subset may be associated with a corresponding combination of attributes values, with each computing device in the respective computing device subset exhibiting and/or being associated with the corresponding combination of attribute values. For example, a first attribute that has four possible categorical values and a second attribute that has six possible categorical values may be used to form up to twenty four possible combinations of attribute value, and thus divide the computing devices into up to twenty four subsets, each associated with a corresponding combination of the possible categorical values of the first and second attributes.

By determining the computing device subsets based on the combinations of attribute values generated by the machine learning model, the computing devices may be partitioned according to attributes that are significantly correlated with and/or predictive of entry into the one or more abnormal device states, but might not be partitioned according to attributes that are not significantly correlated with and/or predictive of the one or more abnormal device states. Thus, each computing device subset may represent the largest grouping of computing devices that is entering the one or more abnormal states due to a given underlying problem. Stated another way, by avoiding partitioning according to attributes that are not significantly correlated with and/or predictive of entry into the one or more abnormal device states, two different computing device subsets are unlikely to be affected by the given problem, thereby providing a well-defined space of potential solutions to the given problem and thus helping to solve the given problem.

The reference data may also be used to determine, for each respective computing device subset identified using the machine learning model, a corresponding first measure/metric (e.g., mean and/or standard deviation) indicative of a first rate at which computing devices of the respective computing device subset have entered the one or more abnormal device states during a first time period represented by the reference data. That is, the reference data may be used to establish a baseline rate at which the one or more abnormal states are entered by computing devices associated with a corresponding inferred combination of attribute values. Although entry of abnormal device states may be undesirable, the computing devices may nevertheless enter at least some of these abnormal states as part of relatively normal operation. Thus, the baseline rate may be used as a reference point in determining whether subsequent entries of the one or more abnormal states are taking place at abnormal (e.g., above average) rates, which may be indicative of a problem to be addressed.

Accordingly, production data may be generated by and collected from one or more computing devices (e.g., from each respective computing device subset). The production data may represent a performance of the one or more computing devices during a second time period (e.g., a most recent time period) following the first time period. For example, the production data may indicate a rate at which the one or more computing devices have entered the one or more abnormal device states. Thus, the production data may be used to determine a corresponding second measure/metric indicative of a second rate at which the one or more computing devices have entered the one or more abnormal device states during the second time period.

A disparity measure/metric may be determined by comparing the first measure/metric and the second measure/metric. That is, the rate of entry of abnormal device states observed in the production data may be compared to the baseline rate indicated by the reference data, thereby allowing for a determination of whether the observed rate of entry of the one or more abnormal device states is outside of the norm indicated by the baseline rate. For example, the first metric and the second metric may be parameters of and/or samples from a statistical distribution, and the disparity metric may thus represent a disparity (e.g., a z-score) between corresponding statistical distribution(s) and/or sample(s) therefrom.

The disparity metric may be used to generate an indication when, for example, the second rate differs from the first rate by more than a threshold amount. The threshold amount may be, for example, a user selected value that distinguishes a normal rate of entry of the one or more abnormal states from an abnormal rate of entry of the one or more abnormal states. The indication may include, for example, a graphical and/or aural signal configured to alert the user of the abnormal rate of entry of the one or more abnormal device states. Accordingly, when abnormal behavior is detected in a given computing device subset, the indication may inform a programmer that one or more adjustments may need to be made to computing devices of the given computing device subset to bring these computing devices back to normal operation.

Accordingly, a first example embodiment may involve determining a combination of a plurality of values of a plurality of attributes represented by reference data associated with a plurality of computing devices by training a machine learning model based on the reference data. The reference data may contain an association between (i) respective values of the plurality of attributes and (ii) the plurality of computing devices entering a first device state of a plurality of possible device states. The combination of the plurality of values may be correlated with entry into the first device state. The first example embodiment may also involve selecting at least a first computing device subset from the plurality of computing devices such that each respective computing device of the first computing device subset is associated with the combination of the plurality of values. The first example embodiment may additionally involve determining, based on a first reference data subset of the reference data, at least a first measure indicative of a first rate at which computing devices of the first computing device subset have entered the first device state during a first time period represented by the first reference data subset. The first reference data subset may correspond to the first computing device subset. The first example embodiment may further involve determining, based on production data corresponding to one or more computing devices associated with the combination of the plurality of values, at least a second measure indicative of a second rate at which the one or more computing devices have entered the first device state during a second time period represented by the production data. The first example embodiment may yet further involve generating, based on a comparison of the first measure to the second measure, an indication that the second rate differs from the first rate by more than a predefined threshold amount.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Figure 1:
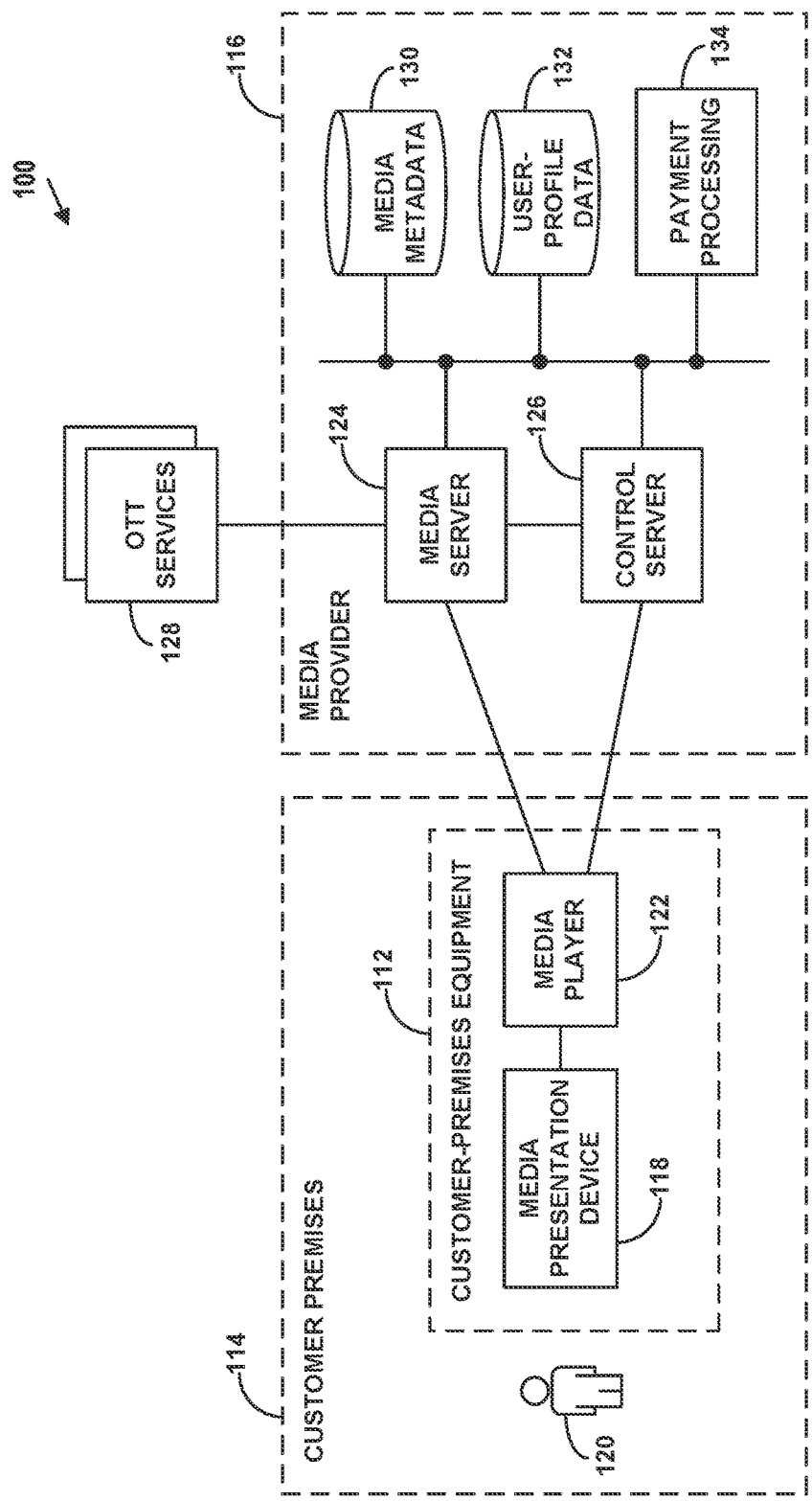
FIG. 1 is a simplified block diagram of an example media presentation system operable in accordance with examples described herein.

Referring to the drawings, FIG. 1 is a simplified block diagram of an example media presentation system 100. Media presentation system 100 includes customer-premises equipment 112 located at customer premises 114 such as a home, and a network based media provider 116 configured to provide customer-premises equipment 112 with media content for presentation.

In the example arrangement, customer-premises equipment 112 includes media presentation device 118 such a TV or other user-interface device configured to present media content to one or more users such as example user 120. Further, customer-premises equipment 112 includes media player 122, such as an OTT device, configured to receive streaming media content and to provide the media content to media presentation device 118 for presentation. In various implementations, media player 122 could be provided as a standalone device connected with media presentation device 118 by a High Definition Multimedia Interface (HDMI) cable or other wired or wireless connection or could be integrated within media presentation device 118 or provided in another manner.

Network-based media provider 116 includes media server 124 configured to stream media content on demand to user devices such as customer-premises equipment 112 and includes control server 126 configured to control the streaming. Media provider 116 could be configured to obtain much of this content on demand from various OTT services 128 and to serve or proxy that media content to customer-premises equipment 112 for presentation.

In an example implementation, media player 122 could be in network communication with both media server 124 and control server 126, to facilitate interacting with media provider 116 to receive information about available media content, and to request and receive streaming media content for presentation on media presentation device 118. For instance, media player 122 may have local area network (LAN) connectivity at customer premises 114, customer premises 114 could have a router and modem (not shown) with an assigned public Internet Protocol (IP) address on the Internet, and media server 124 and control server 126 could be accessible at respective public IP addresses as well. Alternatively, media player 122 could have virtual private network (VPN) connectivity with media server 124 and control server 126, among other possibilities.

Streaming of media content from media server 124 to media player 122 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. As the details of these streaming protocols are known, they will not be described here.

In the example implementation, media provider 116 could include or otherwise have access to various data and platforms to facilitate providing streaming media services to users such as user 120. As shown, for instance, media provider 116 could have access to media metadata 130, user profile data 132, and a payment processing system 134. Media metadata 130 could include a variety of information regarding each of various media-content items available for streaming, such as title, duration, genre, production staff, menu graphics, and ratings, among other possibilities. User profile data 132 could include profile records for users and associated customer-premises equipment configured to receive streaming media service provided by media provider 116, such as user name, equipment location, user-payment information (e.g., credit card information), and mobile phone number if applicable. And payment processing system 134 could be configured to securely interact with a commercial payment processing platform (e.g., a credit-card service) (not shown) and with a user such as user 120, to enable media provider 116 to process user payments for media streaming and/or other services.

As noted above, media presentation system 100 could be configured to present user 120 with an on-screen media-content selection menu, and the user could operate a remote control (not shown) to navigate through that menu and interact with various on-screen prompts in order to select a desired media-content item to be presented and to direct the system to present that selected item. In practice, for instance, control server 126 could serve media player 122 with graphical user interfaces (GUIs) representing various menu screens and prompts, and media player 122 could responsively output the GUIs for presentation by media presentation device 118. Control server 126 could establish these GUIs based on media metadata 130 and user profile data 132, such as restricting the GUIs to present information about media content that is available for streaming to user 120. And control server 126 could receive user input entered into media player 122 and could respond to the user input by generating and transmitting other GUIs to media player 122 for presentation.

Figure 2:
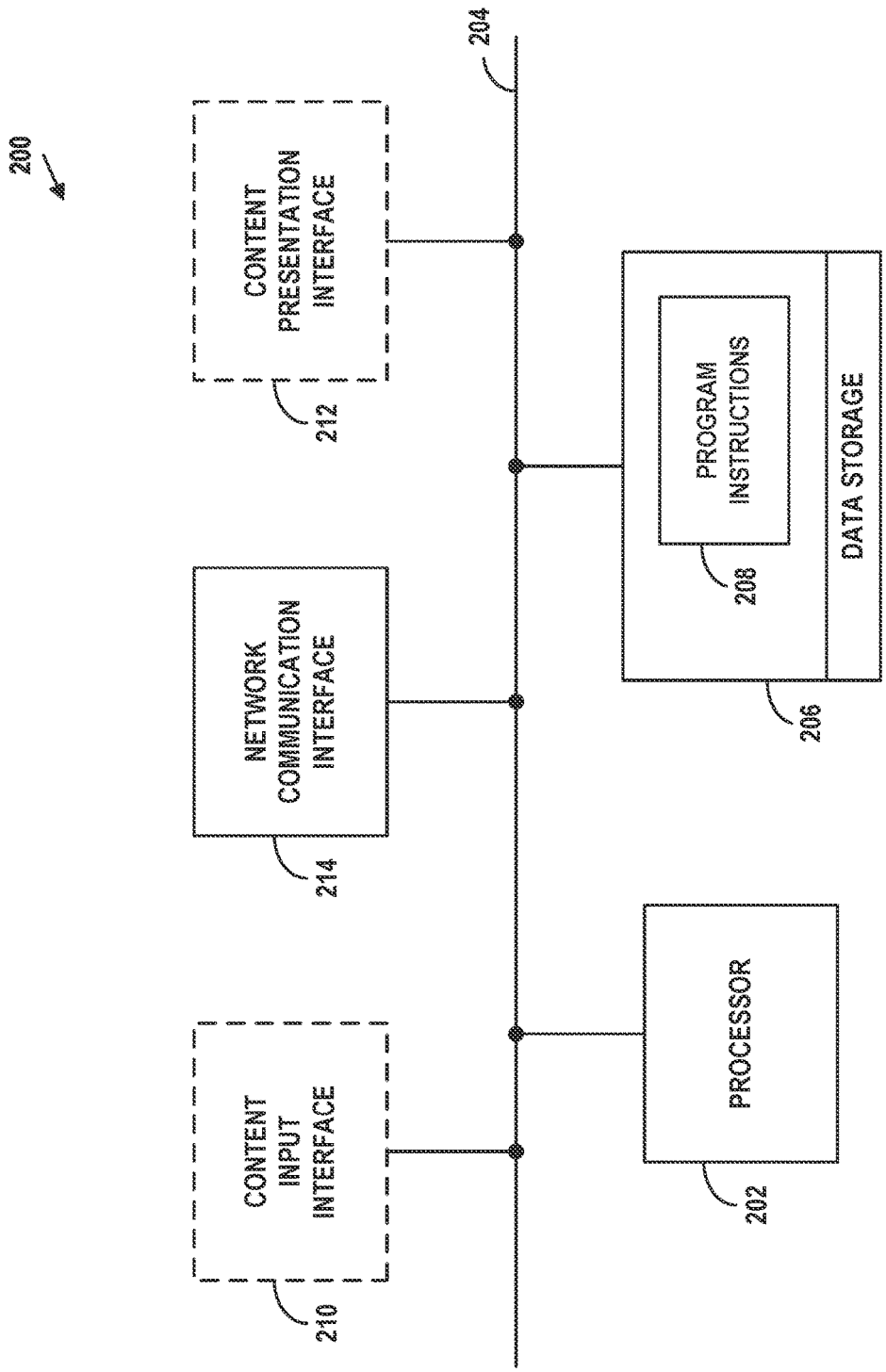
FIG. 2 is a simplified block diagram of an example computing system operable in accordance with examples described herein.

FIG. 2 is a simplified block diagram of an example computing system 200 operable in accordance with the present disclosure. Computing system 200 could represent one or more components of or associated with media presentation system 100, among other possibilities. Computing system 200 includes network communication interface 214, processor 202, and non-transitory data storage 206. In some implementations, computing system 200 may additionally include content input interface 210 and content presentation interface 212. Any or all of the components of computing system 200 could be integrated together or, as shown, communicatively linked together by a system bus, network, or other connection mechanism 204.

In one example, computing system 200 could represent control server 126 as described above and/or one or more other components of or associated with media provider 116, among other possibilities. In another example, when computing system 200 includes content input interface 210 and content presentation interface 212, computing system 200 could represent customer-premises equipment 112, including aspects of media player 122 and/or media presentation device 118, among other possibilities.

Network communication interface 214 could comprise one or more physical network connection mechanisms to facilitate communication on a network, and/or for engaging in direct or networked communication with one or more other local or remote entities. As such, network communication interface 214 could comprise a wireless or wired Ethernet interface or other type of network interface, for engaging in IP communication and/or other type of network communication.

Further, processor 202 could comprise one or more general purpose processors (e.g., microprocessors) and/or one or more specialized processors (e.g., application specific integrated circuits). Non-transitory data storage 206 could comprise one or more volatile and/or non-volatile storage components, such as optical, magnetic, or flash storage. As shown, data storage 206 could further store program instructions 208, which could be executable by processor 202 to carry out various operations described herein.

Content input interface 210 could comprise a physical communication interface for receiving media content to be presented by the customer-premises equipment. As such, content input interface 210 could include one or more wired and/or wireless interfaces for establishing communication with and receiving media content in analog or digital form from a media source.

Content presentation interface 212 could comprise one or more components to facilitate presentation of the received media content. By way of example, the content presentation interface 212 could comprise a user interface such as a display screen and/or a loudspeaker, as well as one or more drivers or other components for processing the received media content to facilitate presentation of the content on the user interface.

Figure 3:
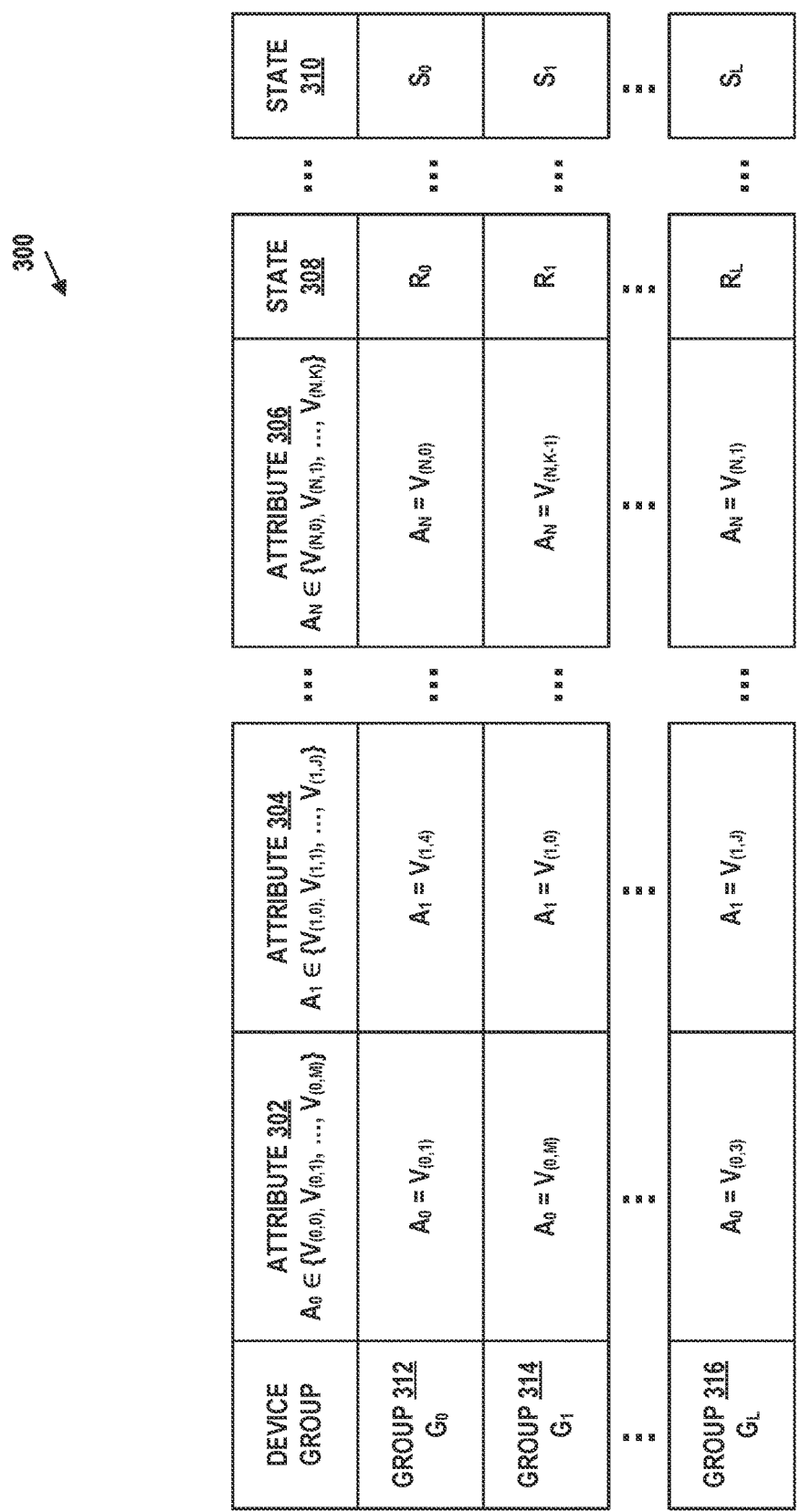
FIG. 3 illustrates reference data, in accordance with examples described herein.

FIG. 3 illustrates a tabular representation of reference data 300 that may be generated by a plurality of computing devices, such as a plurality of instances of media player 122 of media presentation system 100. Specifically, each respective computing device of the plurality of computing devices may be associated with a corresponding value for each respective attribute of a plurality of attributes. In the example shown in FIG. 3, the plurality of attributes include attribute 302, which may be expressed as $A_0$, and attribute 304, which may be expressed as $A_1$, through attribute 306, which may be expressed as $A_N$ (i.e., attributes 302-306, or $A_0$-$A_N$). Thus, the plurality of attributes may include N+1 attributes, each of which may have one or more possible values.

For example, a value of attribute 302 may be selected from M possible values $V_{0,0}$, $V_{0,1}$, . . . , $V_{0,M}$, that is, $A_0 \in \{V_{0,0}, V_{0,1} \ldots , V_{0,M}\}$, where $V_{i,j}$ denotes the jth possible value of attribute $A_i$. A value of attribute 304 may be selected from J possible values $V_{0,0}, V_{0,1}, \ldots, V_{0,J}$, that is, $A_1 \in \{V_{1,0}, V_{1,1}, \ldots, V_{0,J}\}$. A value of attribute 306 may be selected from K possible values $V_{N,0}, V_{N,1}, \ldots, V_{N,K}$, that is, $A_N \in \{V_{N,0}, V_{N,1}, \ldots, V_{N,K}\}$. The number of possible values of a given attribute may be a result of the information represented by the given attribute. In some cases, a continuous range of possible values of the given attribute may be discretized into a finite number of categories.

Each of attributes 302-306 may represent a corresponding property of and/or a corresponding property associated with each computing device of the plurality of computing devices. As one example, attribute 302 may represent an operating system version of each computing device, with values $V_{0,0}$-$V_{0,M}$ representing M different versions of the operating system. Thus, $V_{0,0}$-$V_{0,M}$ may represent possible values of a categorical variable, and the value of M may vary depending on the number of different possible operating system versions that the plurality of computing devices utilize. As another example, attribute 304 may represent a hardware configuration (e.g., device model) of each computing device, with values $V_{0,0}$-$V_{0,J}$ representing J different hardware configurations. Thus, the value of j may vary depending on the number of different possible hardware configurations of the plurality of computing devices. Other attributes may represent a network connection type, a network connection speed, a geographic location, a software application being executed, and/or a server device with which communication is established, among other possibilities. In general, attributes 302-306 may represent any information that can be logged by and/or obtained from the plurality of computing devices, including media metadata 130 and/or user-profile data 132.

Reference data 300 may represent the plurality of computing devices, which may be arranged into a plurality of groups, or computing device subsets. The plurality of groups may be defined based on the values of attributes 302-306. Specifically, the plurality of computing devices may be divided into L+1 groups, including group 312, which may be expressed as $G_0$, and group 314, which may be expressed as $G_1$, through group 316, which may be expressed as $G_L$ (i.e., groups 312-316, or $G_0$-$G_L$). The computing devices of a given group of groups 312-316 may share the same values for each of attributes 302-306.

That is, reference data 300 may be partitioned according to the values of attributes 302-306 to create a plurality of computing device groups with shared attribute values. For example, each respective computing device of group 312 may be associated with attribute values $A_0=V_{0,1}$, $A_1=V_{1,4}$, and $A_N=V_{N,0}$. Similarly, each respective computing device of group 314 may be associated with attribute values $A_0=V_{0,M}$, $A_1=V_{1,0}$, and $A_N=V_{N,K-1}$, and each respective computing device of group 316 may be associated with attribute values $A_0=V_{0,3}$, $A_1=V_{1,J}$, and $A_N=V_{N,1}$. Because the computing devices of a given group all share the same values of attributes 302-306, these computing devices are likely to operate in a similar manner.

The computing device groups, or subsets, represented by reference data 300 may be referred to as training groups/subsets and/or raw groups/subsets, since these groupings/subsets represent unprocessed data that may include attributes and/or attribute values that are uncorrelated with entry into particular device states. In contrast, the computing device subsets identified based on training of the machine learning model, as discussed with respect to FIG. 4, may be referred to as inferred subsets/groups, since these subsets/groupings may represent attributes and/or attribute values that are correlated with and/or predictive of entry into the particular device states and may omit attributes and/or attribute values that are uncorrelated with entry into particular device states.

Reference data 300 may also indicate, for each respective group of groups 312-316, a rate at which computing devices of the respective group have been observed to enter one or more device states of a plurality of possible device states. The plurality of possible device states may represent, for example, states of a finite state machine or another model that may be used to represent and/or model operations of the plurality of computing devices. The one or more device states of the plurality of possible states may represent and/or be classified as abnormal states, while other states may represent and/or be classified as normal states. Entering an abnormal state may be undesirable because, for example, the abnormal state may be associated with degraded and/or erroneous device performance, and may thus affect one or more key performance indicators.

For example, reference data may represent entry rates of state 308 through state 310 (i.e., states 308-310), which may represent abnormal device states. For example, state 308 may represent a system crash event, and state 310 may represent a content loading/buffering event, with other states representing other undesirable device behaviors and/or events. Specifically, computing devices of group 312 may enter state 308 with rate $R_0$ (e.g., crashes per unit time) and state 310 with rate $S_0$ (e.g., buffering time per content viewing), computing devices of group 314 may enter state 308 with rate $R_1$ and state 310 with rate $S_1$, and computing devices of group 316 may enter state 308 with rate $R_L$ and state 310 with rate $S_L$. Thus, reference data 300 may contain an association between different (training) combinations of the possible values of attributes 302-308 and entry rates of states 308-310.

However, while reference data 300 may contain an association between combinations of attribute values and device states, reference data 300 might not explicitly indicate statistically significant and/or causal relationships between the (training) combinations of attribute values and the device states. That is, reference data 300 may need to be processed in order to determine one or more combinations of values of attributes 302-306 that are statistically and/or causally linked with entry into one or more of states 308-310. Identifying such statistical and/or causal links may allow a programmer to monitor and/or adjust attributes that are likely to be causing abnormal device performance, rather than focusing on attributes that might be unrelated to the abnormal device performance.

As the number of attributes, attribute values, and/or monitored abnormal device states increases, processing of reference data 300 may become increasingly time-consuming, and it may thus become increasingly important to determine the statistical and/or causal link using a scalable and/or computationally-efficient approach. For example, a permutation-based brute force approach may take on the order or tens of hours to complete, and may thus be unsuitable for use in systems where results are desired to be ready within a time on the order of hours or minutes.

Figure 4:
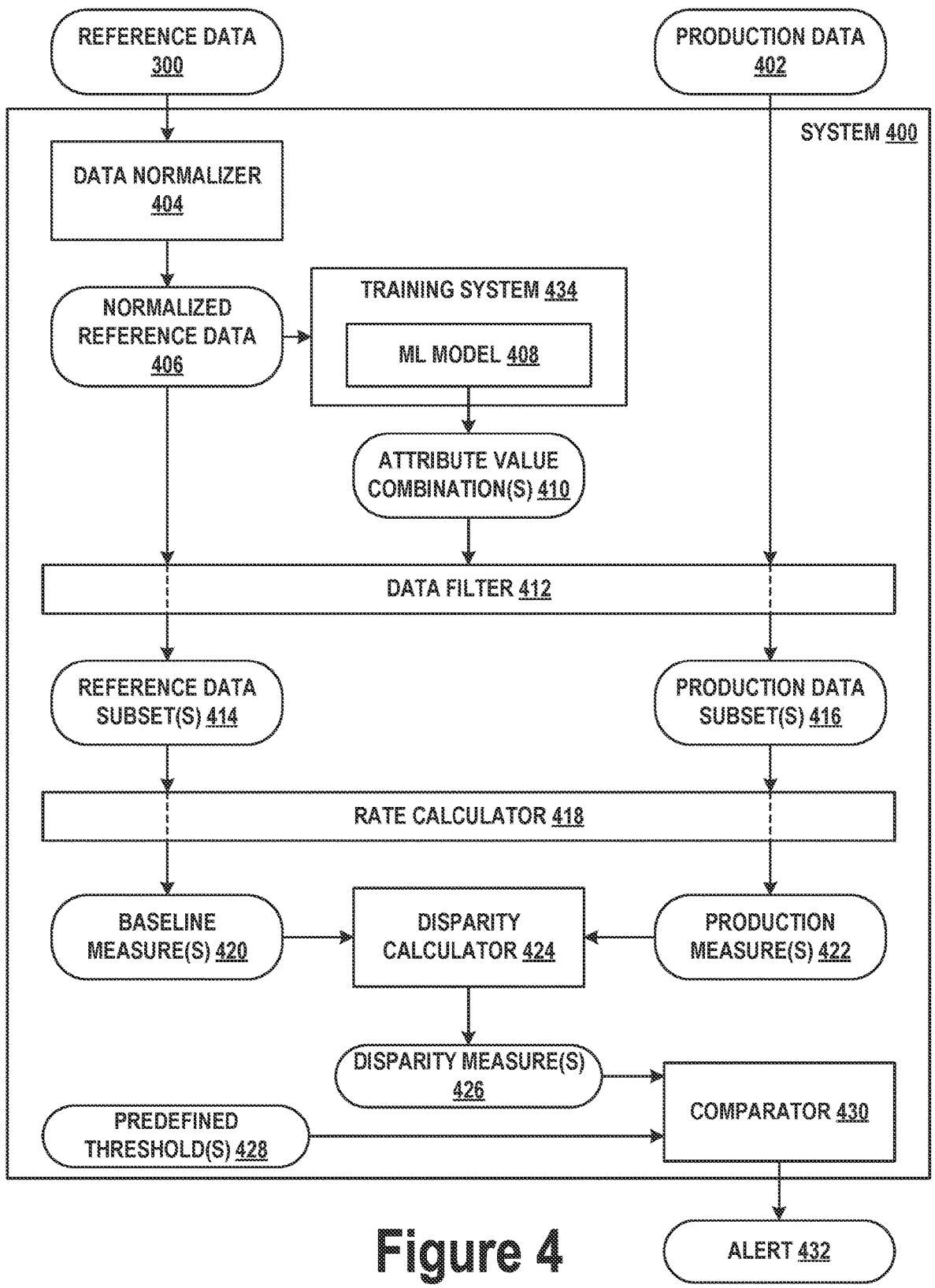
FIG. 4 illustrates an ML-based anomaly detection system, in accordance with examples described herein.

Accordingly, FIG. 4 illustrates system 400, which may be configured to identify the statistically significant and/or causal relationships between the combinations of attribute values and entry of certain device states and, based on these relationships, to monitor the computing devices for abnormally frequent entry of these device states. Specifically, system 400 may include data normalizer 404, training system 434, machine learning (ML) model 408, data filter 412, rate calculator 418, disparity calculator 424, and comparator 430.

Data normalizer 404 may be configured to generate normalized reference data 406 based on reference data 300. In one example, data normalizer 404 may be configured to, for each respective attribute of the plurality of attributes represented by reference data 300, encode each value of the respective attribute as a vector value and/or other numerical representation, which may facilitate training of ML model 408. In another example, data normalizer 404 may remove one or more attributes from reference data 300 when, for example, it is known that these one or more attributes (e.g., device color, device dimensions, etc.) are not correlated with a particular device state. Data normalizer 404 may thus also be configured to adjust the grouping (e.g., $G_0$-$G_L$) of the plurality of computing devices to account for removal of the one or more attributes by, for example, combining two or more groups.

In some implementations, reference data 300 might include raw data representing the rates of entry of the one or more abnormal device states. Thus, in such implementations, data normalizer 404 may also be configured to determine the numerical values of the rates (e.g., $R_0$-$R_L$ and/or $S_0$-$S_L$) based on the raw data. In other implementations, data normalizer 404 may be configured to discretize the rates of entry of the one or more states. For example, a range (e.g., 0% to 100%) of entry rates for a given state may be divided into two or more discrete categories (e.g., a low category from 0% to 33%, a moderate category from 34% to 66%, and a high category from 67% to 100%), which may simplify the training of ML model 408. Additionally or alternatively, data normalizer 404 may perform other operations configured to prepare reference data 300 to be used by training system 434.

Training system 434 may be configured to train ML model 408 based on normalized reference data 406. In some implementations, the entry rates of one or more abnormal states, as represented by normalized reference data 406, may be used as ground-truth labels for each respective (training) combination of attribute values represented by normalized reference data 406. Thus, training system 434 may be configured to train ML model 408 to predict the entry rate of one or more computing devices into a particular abnormal device state based on respective attribute values associated with the one or more computing devices.

In some implementations, once ML model 408 is trained, its structure may represent attribute value combination(s) 410. Accordingly, ML model 408 may be a white-box model that allows the structure and/or operations thereof to be human-interpretable and/or programmatically-extractable, thus allowing attribute value combination(s) 410 to be determined based on ML model 408. Additionally, the white-box model may retain, or keep intact, the identities and/or feature dimensions of the attributes of normalized reference data 406, thus allowing the role of each of the original attributes in predicting entry into abnormal states to be observed and/or determined from the structure of ML model 408. ML model 408 may be configured to, but might not be used to, determine entry rates of computing devices into abnormal device states. Instead, the structure of ML model 408 may be used to determine how strongly each attribute and/or the values thereof correlate with and/or predict entry into one or more abnormal device states.

Figure 5:
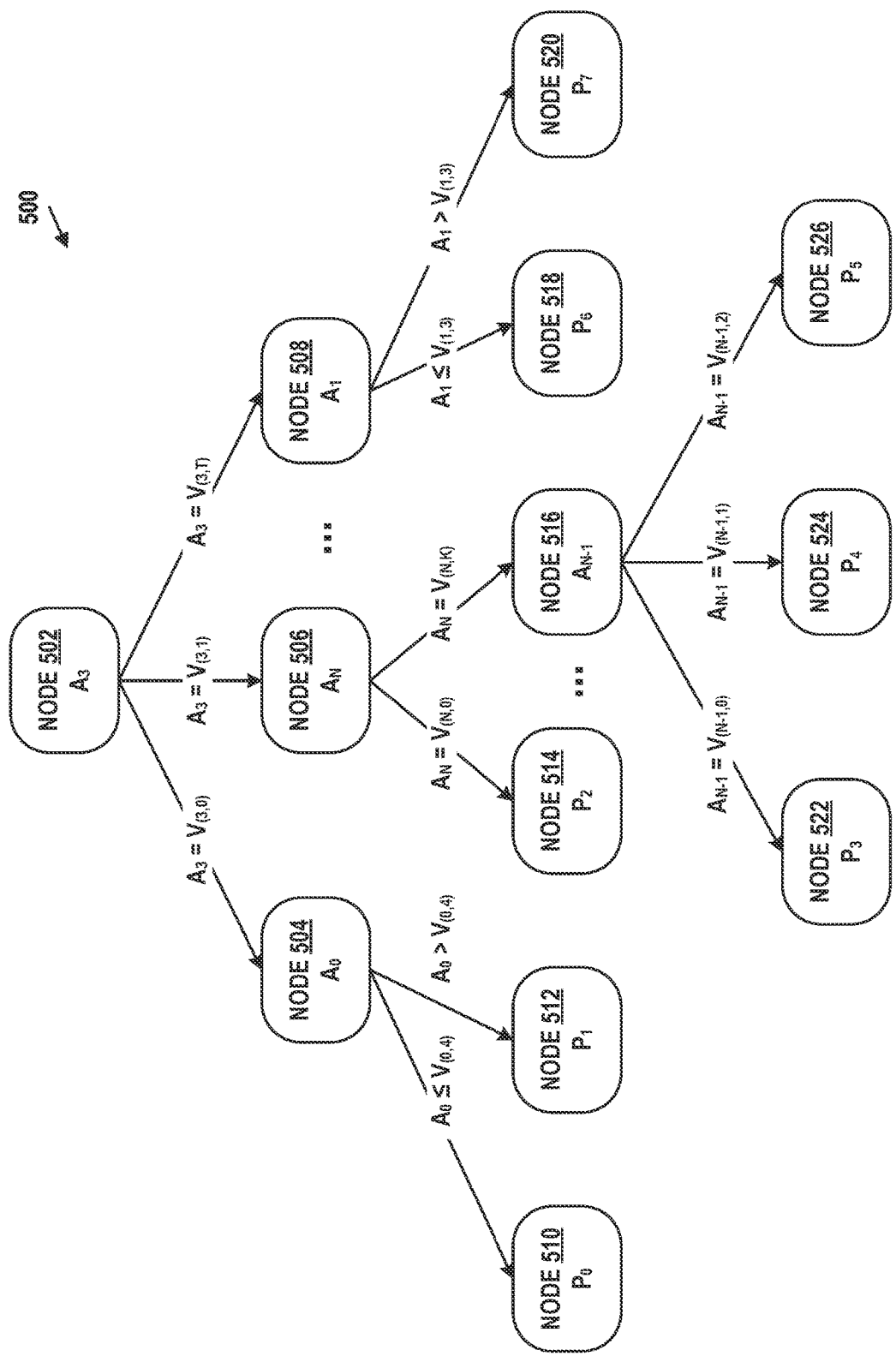
FIG. 5 illustrates a trained decision tree model, in accordance with examples described herein.

For example, ML model 408 may include a decision tree model, such as that shown in and discussed with respect to FIG. 5, where attribute value combination(s) 410 are defined by the hierarchical ordering of nodes of the decision tree. When ML model 408 is a decision tree model, training system 434 may be configured to train ML model 408 using, for example, an iterative dichotomizer (e.g., ID3, C4.5) algorithm, a classification and regression trees (CART) algorithm, Chi-square automatic interaction detection (CHAID) algorithm, and/or Multivariate adaptive regression spline (MARS), among other possibilities. Additionally, training of ML model 408 may be based on entropy, information gain, Gini index, and/or variance reduction, among other possibilities. Further, once a preliminary decision tree model is generated, it may then be pruned to remove nodes that do not provide sufficient additional information, reduce a size (e.g., number of nodes) of the decision tree to under a threshold size, and/or reduce a frequency of alerts resulting from using the decision tree to under a threshold frequency, among other objectives. In implementations that use other types and/or architecture of machine learning model 408, other model-specific training techniques may be utilized by training system 434 (e.g., gradient descent and backpropagation, in the case of neural network-based architectures).

Attribute value combination(s) 410 may represent one or more combinations of two or more attribute values of the plurality of attributes (e.g., attributes 302-306) represented by normalized reference data 406. Each of these one or more combinations of the attribute values may be associated with and/or predictive of entry into a particular device state, which may be classified as abnormal. In some cases, the set of attributes represented by attribute value combination(s) 410 might not include all of the attributes and/or attribute values represented by reference data 300 and/or normalized reference data 406, since some of the attributes and/or attribute values represented by reference data 300 and/or 406 might not be predictive of and/or correlated with entry into the particular device state. That is, the training of ML model 408 may operate to discard, or filter out, attributes and/or attribute values that are irrelevant to, uncorrelated with, and/or insufficiently predictive of entry into the particular device state, thus defining a reduced space of potential causes of an identified abnormal device behavior.

In some implementations, each respective combination of the one or more combinations represented by attribute value combination(s) 410 may include a representation of an order, or ranking, of the attributes and/or attribute values included in the respective combination. The ranking may be represented as, for example, a linked lists and or a tree, and may indicate a relative correlation of each ranked attribute and/or value thereof with entry into one or more abnormal device states represented by normalized reference data 406. For example, a first attribute value of a first attribute that is more strongly correlated with entry into the one or more abnormal device states than a second attribute value of a second attribute may be ranked higher than the second attribute value. In some cases, attribute value combination(s) 410 may include a single ranking that applies to all computing devices represented by normalized reference data 406. In other cases, attribute value combination(s) 410 may include a plurality of rankings, with each respective ranking of the plurality of rankings corresponding to a respective (inferred) computing device subset identified by ML model 408 within normalized reference data 406. For example, when ML model 408 includes a decision tree model, each respective attribute value combination may be represented by a path from a corresponding leaf node of the decision tree model to a root node of the decision tree model, and a number of possible attribute value combination(s) 410 may thus be equal to a number of leaf nodes of the decision tree model (which may, and likely will, differ from a number of groups 312-316).

Data filter 412 may be configured to select reference data subset(s) 414 based on attribute value combination(s) 410. Specifically, data filter 412 may be configured to partition normalized reference data 406 and/or reference data 300 according to the different combinations of attribute values represented by attribute value combination(s) 410. Thus, for each respective attribute value combination represented by attribute value combination(s) 410, a respective reference data subset may be determined, where the respective reference data subset has been generated by computing devices associated with the respective attribute value combination. In particular, the respective reference data subset may have been generated by a respective computing device subset of the plurality of computing devices, where each respective computing device in the respective computing device subset is associated with the respective attribute value combination.

For example, when attribute value combination(s) 410 includes N combinations, normalized reference data 406 and/or reference data 300 may be partitioned into N reference data subsets generated by a corresponding N computing device subsets, each associated with a corresponding combination of the N combinations. In some cases, N may be smaller than the number of groups 312-316 (i.e., L+1). Thus, each respective reference data subset of reference data subset(s) 414 may be generated by a corresponding group of computing devices that share the respective attribute value combination, and are thus likely to behave (e.g., experience problems) in the same and/or similar ways and/or due to the same and/or similar causes.

Rate calculator 418 may be configured to determine baseline measure(s) 420 (alternatively referred to as first measure(s)) based on reference data subset(s) 414. Each respective baseline measure of baseline measure(s) 420 may represent a baseline rate at which computing devices of the corresponding computing device subset enter the one or more abnormal device states. Each respective baseline measure of baseline measure(s) 420 may be determined based on a corresponding reference data subset of reference data subset(s) 414. Thus, for example, N baseline measures may be determined based on N reference data subsets.

Reference data subset(s) 414 may represent normal, usual, and/or average operation of the plurality of computing devices during a first time period. Thus, baseline measure(s) 420 may represent the normal, usual, and/or average rates at which corresponding subsets of the plurality of computing devices enter the one or more abnormal device states, and may thus be used as a point of reference for determining whether computing devices are, at other times, entering the one or more abnormal device states at unusually and/or abnormally high rates. Baseline measure(s) 420 may include, for each respective computing device subset, one or more parameters of a statistical distribution of the rate(s) at which computing devices of the respective computing device subset have entered the one or more abnormal device states during the first time period. These parameters may include, for example, a mean, standard deviation, median, and/or expected value, among other possibilities.

In order to determine whether one or more computing devices are entering the one or more abnormal states at unusually high rates, which may indicate an underlying problem associated with the one or more computing devices, system 400 may be configured to obtain production data 402. The one or more computing devices by which production data 402 is generated may include a subset of the plurality of computing devices from which reference data 300 was obtained and/or additional computing devices that were not part of the plurality of computing devices from which reference data 300 was obtained. Production data 402 may represent the same or similar attributes and/or values thereof as reference data 300, and may include computing device groupings and state entry rates in a format similar to that of reference data 300.

Production data 402 may represent operations of the one or more computing devices during a second time period during which the rate of entry into the one or more abnormal device states may be below, the same as, or above the baseline rates represented by reference data 300. For example, the second time period may be after one or more updates, modifications, and/or changes have been made to aspects of the one or more computing devices. Thus, (second) production measures of production data 402 may be compared with corresponding (first) baseline measures of reference data 300 to determine whether the one or more computing devices are operating normally (e.g., entering the one or more abnormal states at about the same rates as experienced during the first time period) or abnormally (e.g., entering the one or more abnormal device states at significantly higher rates than experienced during the first time period). In some cases, the second time period may be shorter than the first time period.

Accordingly, data filter 412 may also be configured to select production data subset(s) 416 based on attribute value combination(s) 410. Specifically, data filter 412 may be configured to partition production data 402 according to the different combinations of attribute values represented by attribute value combination(s) 410, in the same or similar manner as the partition of normalized reference data 406 and/or reference data 300. Thus, for each respective attribute value combination represented by attribute value combination(s) 410, a respective production data subset may be determined, where the respective production data subset has been generated by one or more computing devices associated with the respective attribute value combination. In particular, the respective production data subset may have been generated by a respective computing device subset of a plurality of computing devices from which production data 402 has been obtained, where each respective computing device in the respective computing device subset is associated with the respective attribute value combination. In some implementations, production data 402 may also be processed by data normalizer 404 in a manner similar to that described above.

Thus, each respective production data subset of production data subset(s) 416 may be associated with the same attribute value combination as a corresponding reference data subset of reference data subset(s) 414. That is, the respective production data subset may be generated by a first group of one or more computing devices and the corresponding reference data subset may be generated by a second group of one or more computing devices, where the computing devices of the first group and the second group share the respective attribute value combination and may include the same or different computing device instances. For example, when reference data subset(s) 414 include N subsets, production data subset(s) 416 may include up to N corresponding subsets.

Rate calculator 418 may also be configured to determine production measure(s) 422 (alternatively referred to as second measure(s)) based on production data subset(s) 416. Each respective production measure of production measure(s) 422 may represent a production rate with which the corresponding one or more computing devices represented by the respective production data subset have entered the one or more abnormal device states. Each respective production measure of production measure(s) 422 may be determined based on a corresponding production data subset of production data subset(s) 416. Production measure(s) 422 may include, for each respective production data subset, one or more parameters of and/or samples from a statistical distribution of the rate(s) at which the corresponding one or more computing devices have entered the one or more abnormal device states during the second time period.

Disparity calculator 424 may be configured to determine disparity measure(s) 426 based on a comparison of baseline measure(s) 420 and production measure(s) 422. Disparity measure(s) 426 may provide a quantitative measure of deviation between (i) the production rate at which one or more computing devices associated with a particular combination of attribute values enter a particular abnormal state and (ii) a corresponding baseline rate for a computing device subset associated with the particular combination of attribute values. Accordingly, the performance of computing devices during the second time period may be compared to the performance of similar computing devices during the first time period. Disparity measure(s) 426 may include a corresponding disparity measure for each respective combination of attribute values represented by attribute value combination(s) 410. Disparity measure(s) 426 may include, for example, a measure of a divergence between two statistical distributions (e.g., Kullback-Leibler divergence) and/or a measure of a relationship between a distribution and a sample therefrom (e.g., z-score), among other possibilities.

Comparator 430 may be configured to generate alert 432 based on a comparison of disparity measure(s) 426 to predefined threshold(s) 428. Specifically, comparator 430 may be configured to generate alert 432 when one or more of disparity measure(s) 426 is greater than corresponding predefined threshold(s) 428, which indicates that the production rate(s) of entry into the one or more abnormal device states differ from the reference rate(s) of entry into the one or more abnormal states by more than the corresponding predefined threshold(s) 428. In some cases, alert 432 may be generated when the production rate(s) of entry into the one or more abnormal device states exceed the reference rate(s) by more than the corresponding predefined threshold(s) 428, which may be indicative of a possible underlying problem with the corresponding one or more computing devices. Additionally or alternatively, alert 432 may be generated when the production rate(s) of entry into the one or more abnormal device states are below the reference rate(s) by more than the corresponding one or more predefined threshold(s) 428, which may be indicative of the corresponding one or more computing devices performing better than anticipated.

Alert 432 may include (i) an indication of the one or more computing devices determined to enter the one or more abnormal states at unusually high or low rates and or (ii) the corresponding attribute value combination to the one or more computing devices, among other possible information. Providing the corresponding attribute value combination as part of alert 432 may allow alert 432 to provide information about the most likely causes of the unusually high rates of abnormal device state entry. For example, identification of the attributes and/or values thereof that are most strongly correlated with and/or predictive of entry into the one or more abnormal device states may reduce an amount of time it takes a programmer and/or user to identify the underlying problem causing the unusually high rates of abnormal device state entry.

FIG. 5 illustrates decision tree model 500, which provides one example of ML model 408 generated by training system 434 based on reference data 300. Specifically, decision tree model 500 includes node 502, node 504, node 506 through node 508, node 510, node 512, node 514 through node 516, node 518, node 520, node 522, node 524, and node 526 (i.e., nodes 502-526). Node 502 may be referred to as a root node, while nodes 510, 512, 514, 518, 520, 522, 524, and 526 may be referred to as leaf nodes.

Root node 502 may be associated with attribute $A_3$, which may indicate that attribute $A_3$ is most strongly correlated with and/or predictive of entry into the one or more abnormal device states. The association of root node 502 with attribute $A_3$ may also indicate a partition of reference data 300 based on values of attribute $A_3$. For example, each respective value of T possible values of attribute $A_3$, where $A_3 \in \{V_{3,0}, V_{3,1}, \ldots, V_{3,T}\}$, may be associated with a corresponding child node depending from root node 502. Specifically, $A_3=V_{3,0}$ may lead to node 504, $A_3=V_{3,1}$ may lead to node 506, and $A_3=V_{3,T}$ may lead to node 508, with other values of $A_3$ leading to other child nodes (not shown) of root node 502.

Node 502 may be associated with attribute $A_0$, node 504 may be associated with attribute $A_N$, and node 508 may be associated with attribute $A_1$. This may indicate that, when $A_3=V_{3,0}$, when $A_3=V_{3,1}$, and when $A_3=V_{3,T}$, each of attributes $A_0$, $A_N$, and $A_1$ is, respectively, a second highest-ranked attribute that is correlated with and/or predictive of entry into the one or more abnormal device states. The association of nodes 504, 506, and 508 with attributes $A_0$, $A_N$, and $A_1$, respectively, may also indicate a further partition of reference data 300 based on values of attributes $A_0$, $A_N$, and $A_1$. For example, for node 506, each respective value of K possible values of attribute $A_N$, where $A_N \in \{V_{N,0}, V_{N,1}, \ldots, V_{N,K}\}$, may be associated with a corresponding child node depending from node 506. Specifically, $A_N=V_{N,0}$ may lead to node 514 and $A_N=V_{N,K}$ may lead to node 516, with other intermediate values leading to other corresponding child nodes (not shown). For nodes 504 and 508, a subsequent node may be selected based on a binary split according to an inequality comparison. Specifically, for node 504, $A_0 \leq V_{0,4}$ may lead to node 510 and $A_0 > V_{0,4}$ may lead to node 512 and, for node 508, $A_1 \leq V_{1,3}$ may lead to node 518 and $A_1 > V_{1,3}$ may lead to node 520.

Node 510 may be associated with attribute $A_1$, node 512 may be associated with attribute $A_2$, node 514 may be associated with attribute $A_4$, node 516 may be associated with attribute $A_{N-1}$, node 518 may be associated with attribute $A_0$, and node 520 may be associated with attribute $A_2$. This may indicate that, when the conditions in the respective parent nodes are satisfied, each of attributes $A_1$, $A_2$, $A_4$, $A_{N-1}$, $A_0$, $A_2$ is, respectively, a third highest-ranked attribute that is correlated with and/or predictive of entry into the one or more abnormal device states. The association of node 516 with attribute $A_{N-1}$ may also indicate a further partition of reference data 300 based on values of attribute $A_{N-1}$. For example, for node 516, $A_{N-1}=V_{N-1,0}$ may lead to node 522, $A_{N-1}=V_{N-1,1}$ may lead to node 524, and $A_{N-1}=V_{N-1,2}$ may lead to node 526.

Each respective leaf node of leaf nodes 510, 512, 514, 522, 524, 526, 518, and 520 may be associated with a corresponding value that indicates a likelihood of entry into the one or more abnormal states based on the combination of attribute values leading from root node 502 to the respective leaf node. Specifically, leaf nodes 510, 512, 514, 522, 524, 526, 518, and 520 may be associated with, respectively, values $P_0$, $P_1$, $P_2$, $P_3$, $P_4$, $P_5$, $P_6$, and $P_7$ (i.e., values $P_1$-$P_7$). Values $P_1$-$P_7$ may be numerical and/or categorical, and may represent an approximation by decision tree model 500 of, for example, the entry rates of state 308 represented by reference data 300.

The structure of decision tree model 500 may be useful in identifying groupings of similar computing devices that, due to shared combinations of attribute values, are likely to operate in similar ways. For example, the structure of decision tree model 500 may represent attribute value combination(s) 410. Namely, nodes 502, 506, 516, and 522 may represent a first attribute value combination of attribute value combination(s) 410, with node 502 being a highest-ranked node and node 522 being a lowest-ranked node of the first subset. Thus, since computing devices with attribute values $A_3=V_{3,1}$, $A_N=V_{N,K}$, and $A_{N-1}=V_{N-1,0}$ are each determined to enter abnormal state 308 with likelihood $P_3$, these computing devices are likely to behave in similar ways and thus form a (inferred) computing device subset that may be used to determine a baseline entry rate for abnormal state 308. The performance of these and other computing devices associated with attribute values $A_3=V_{3,1}$, $A_N=V_{N,K}$, and $A_{N-1}=V_{N-1,0}$ may thus be monitored over time by comparing production entry rates for abnormal state 308 to the baseline entry rate.

In another example, nodes 502, 504, and 512 may represent a second attribute value combination of attribute value combination(s) 410, with node 502 being a highest-ranked node and node 512 being a lowest-ranked node of the second subset. Thus, since computing devices with attribute values $A_3=V_{3,0}$ and $A_0>V_{0,4}$ are each determined to enter abnormal state 308 with likelihood $P_1$, these computing devices are likely to behave in similar ways and thus form another computing device subset that may be used to determine another baseline entry rate for abnormal state 308. Similarly, additional attribute value combinations of attribute value combination(s) 410 may be formed by other respective sequences from a given leaf node to root node 502.

In some implementations, decision tree model 500 may be generated as part of a random forests and/or another ensemble-based architecture. Additionally, decision tree model 500 may include nodes that have been generated using binary splitting, resulting in two child nodes per parent node (e.g., child nodes 510 and 512 depending from parent node 504), and/or non-binary splitting, resulting in three or more child nodes per parent node (e.g., child nodes 504-508 depending from parent node 502).

Decision tree 500 may be a result of pruning a larger preliminary/intermediate decision tree model generated by training system 434. Such pruning may remove from the preliminary/intermediate decision tree model attributes and/or values thereof that are not correlated with and/or predictive of entry into a particular device states. Thus, such pruning may result in attribute value combination(s) 410 representing a portion of, rather than the entirety of, the attributes and/or values thereof represented by reference data 300. In some cases, pruning may be performed based on validation data, which may be similar to production data 402, such that a frequency with which alert 432 is generated based on the validation data is reduced under a threshold frequency. That is, the validation data may allow the structure of decision tree model 500 to be fine-tuned to distinguish between (i) significant underlying problems with one or more computing device and (ii) intermittent noise.

Figure 6:
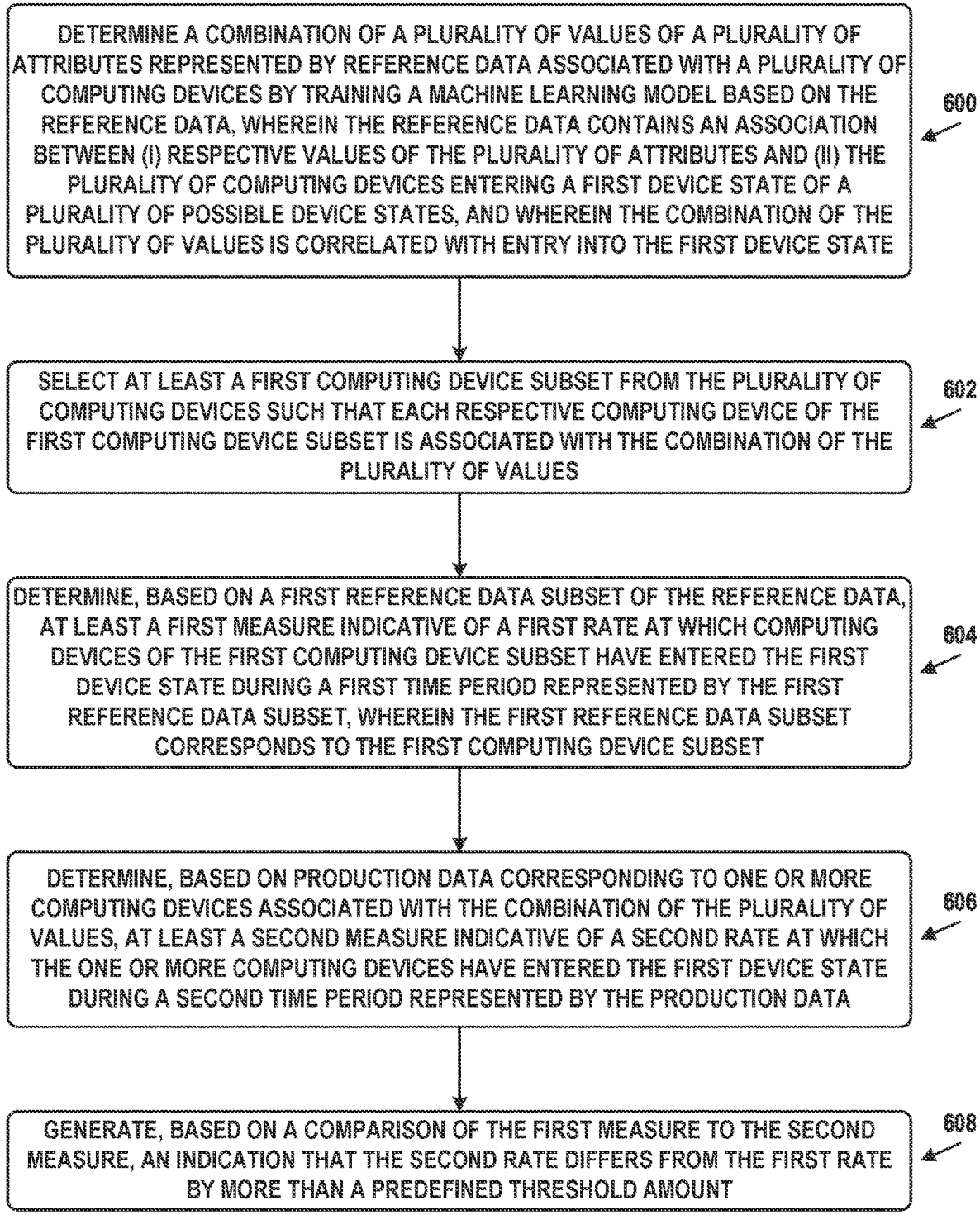
FIG. 6 is a flow chart, in accordance with examples described herein.

FIG. 6 is a flow chart depicting a method that can be carried out in accordance with the present disclosure. The method may be carried out, for example, by media presentation system 100, computing system 200, and/or system 400.

Block 600 may include determining a combination of a plurality of values of a plurality of attributes represented by reference data associated with a plurality of computing devices by training a machine learning model based on the reference data. The reference data may contain an association between (i) respective values of the plurality of attributes and (ii) the plurality of computing devices entering a first device state of a plurality of possible device states. The combination of the plurality of values may be correlated with entry into the first device state.

Block 602 may include selecting at least a first computing device subset from the plurality of computing devices such that each respective computing device of the first computing device subset is associated with the combination of the plurality of values.

Block 604 may include determining, based on a first reference data subset of the reference data, at least a first measure indicative of a first rate at which computing devices of the first computing device subset have entered the first device state during a first time period represented by the first reference data subset. The first reference data subset may correspond to the first computing device subset.

Block 606 may include determining, based on production data corresponding to one or more computing devices associated with the combination of the plurality of values, at least a second measure indicative of a second rate at which the one or more computing devices have entered the first device state during a second time period represented by the production data.

Block 608 may include generating, based on a comparison of the first measure to the second measure, an indication that the second rate differs from the first rate by more than a predefined threshold amount.

In some embodiments, at least part of a structure of the machine learning model that results from the training may represent the combination of the plurality of values. A representation of the combination of the plurality of values by the structure of the machine learning model may be human-interpretable.

In some embodiments, the machine learning model may include a decision tree model. The combination of the plurality of values may be represented by a hierarchy of a plurality of nodes of the decision tree model resulting from the training.

In some embodiments, training the decision tree model may include pruning one or more nodes of the plurality of nodes of the decision tree model. The pruning may include determining, based on validation data corresponding to one or more validation computing devices associated with the combination of the plurality of values, a plurality of validation measures indicative of a plurality of validation rates at which the one or more validation computing devices have entered the first device state during a plurality of time periods represented by the validation data. The pruning may also include determining a plurality of validation disparity measures by comparing the first measure to the plurality of validation measures. The pruning may further include removing the one or more nodes from the decision tree model until the plurality of validation disparity measures exceeds a validation threshold with no more than a threshold frequency.

In some embodiments, the reference data may be generated by obtaining a plurality of reference data subsets by obtaining each respective reference data subset of the plurality of reference data subsets from a corresponding computing device subset of the plurality of computing devices that is associated with a corresponding training combination of a plurality of training values of the plurality of attributes.

In some embodiments, generating the reference data may also include determining, for each respective reference data subset of the plurality of reference data subsets, a corresponding rate at which respective computing devices of the corresponding computing device subset enter the first device state. Training the machine learning model may include training the machine learning model to approximate the corresponding rate based on the corresponding training combination of the plurality of training values of the plurality of attributes.

In some embodiments, generating the reference data may also include selecting, for each respective reference data subset of the plurality of reference data subsets, a corresponding classification from a plurality of predefined classifications by comparing (a) a corresponding rate at which respective computing devices of the corresponding computing device subset enter the first device state to (b) a threshold rate. Training the machine learning model may include training the machine learning model to approximate the corresponding classification based on the corresponding training combination of the plurality of training values of the plurality of attributes.

In some embodiments, determining the combination of the plurality of values may include selecting the combination of the plurality of values from two or more combinations of the plurality of values of the plurality of attributes. The selecting of the combination of the plurality of values may be based on an extent of correlation of each respective combination of the two or more combinations with entry into the first device state. The extent of correlation of each respective combination may be indicated by the machine learning model.

In some embodiments, the combination of the plurality of values may define an order of two or more attributes of the plurality of attributes. The order may define a relative correlation of each attribute of the two or more attributes with entry into the first device state. Generating the indication may include generating a representation of the order.

In some embodiments, a first attribute of the plurality of attributes may include a first value that forms part of the combination of the plurality of values and a second value. After the training, the machine learning model may be configured to indicate that (i) the first value, when associated with at least one computing device, is correlated with the at least one computing device entering the first device state and (ii) the second value, when associated with the at least one computing devices, is correlated with the at least one computing device avoiding the first device state.

In some embodiments, determining the combination of the plurality of values may include determining a plurality of combinations of the plurality of values. Selecting the first computing device subset may include selecting a plurality of computing device subsets from the plurality of computing devices such that, for each respective computing device subset of the plurality of computing device subsets, a respective combination of the plurality of combinations (i) corresponds to the respective computing device subset and (ii) is associated with each respective computing device of the respective computing device subset. Determining the first measure may include, for each respective computing device subset of the plurality of computing device subsets, determining, based on a respective reference data subset that corresponds to the respective computing device subset, a corresponding first measure indicative of a corresponding first rate at which computing devices of the respective computing device subset have entered the first device state during the first time period represented by the respective reference data subset. Determining the second measure may include, for each respective combination of the plurality of combinations, determining, based on respective production data corresponding to respective one or more computing devices associated with the respective combination, a corresponding second measure indicative of a corresponding second rate at which the respective one or more computing devices have entered the first device state during the second time period represented by the respective production data. Generating the indication may include determining, for each respective combination of the plurality of combinations, a respective disparity measure by comparing the corresponding first measure to the corresponding second measure. Generating the indication may also include generating, based on the respective disparity measure for each respective combination of the plurality of combinations, one or more indications that the corresponding second rate differs from the corresponding first rate by more than the predefined threshold amount.

In some embodiments, the first device state of a computing device of the plurality of computing devices may represent an abnormal device state in which one or more systems associated with the computing device operate abnormally.

In some embodiments, the first time period may represent operation of the first computing device subset before a change in one or more values of one of more attributes of the plurality of attributes. The second time period may represent operation of the one or more computing devices after the change in the one or more values of the one or more attributes.

In some embodiments, the change in the one or more values of the one of more attributes may be caused by release of an update to one or more subsystems associated with the plurality of computing devices.

In some embodiments, the first measure may include a first parameter of a first statistical distribution that represents the first rate. The second measure may include a second parameter of a second statistical distribution that represents the second rate. The comparison of the first measure to the second measure may include determining a disparity measure that represents a disparity between the first statistical distribution and the second statistical distribution.

In some embodiments, the plurality of computing devices may include a plurality of media presentation devices.

In some embodiments, the indication that the second rate differs from the first rate by more than the predefined threshold amount may include an identification of at least one of (i) the computing devices of the first computing device subset or (ii) the one or more computing devices associated with the combination of the plurality of values.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    determining a combination of a plurality of values of a plurality of attributes represented by reference data associated with a plurality of computing devices by training a machine learning model based on the reference data, wherein the reference data contains an association between (i) respective values of the plurality of attributes and (ii) the plurality of computing devices entering a first device state of a plurality of possible device states, and wherein the combination of the plurality of values is correlated with entry into the first device state;
    selecting at least a first computing device subset from the plurality of computing devices such that each respective computing device of the first computing device subset is associated with the combination of the plurality of values;
    determining, based on a first reference data subset of the reference data, at least a first measure indicative of a first rate at which computing devices of the first computing device subset have entered the first device state during a first time period represented by the first reference data subset, wherein the first reference data subset corresponds to the first computing device subset;
    determining, based on production data corresponding to one or more computing devices associated with the combination of the plurality of values, at least a second measure indicative of a second rate at which the one or more computing devices have entered the first device state during a second time period represented by the production data; and
    generating, based on a comparison of the first measure to the second measure, an indication that the second rate differs from the first rate by more than a predefined threshold amount.

2. The computer-implemented method of claim 1, wherein at least part of a structure of the machine learning model that results from the training represents the combination of the plurality of values, and wherein a representation of the combination of the plurality of values by the structure of the machine learning model is human-interpretable.

3. The computer-implemented method of claim 2, wherein the machine learning model comprises a decision tree model, and wherein the combination of the plurality of values is represented by a hierarchy of a plurality of nodes of the decision tree model resulting from the training.

4. The computer-implemented method of claim 3, wherein training the decision tree model comprises pruning one or more nodes of the plurality of nodes of the decision tree model, wherein the pruning comprises:
    determining, based on a validation data corresponding to one or more validation computing devices associated with the combination of the plurality of values, a plurality of validation measures indicative of a plurality of validation rates at which the one or more validation computing devices have entered the first device state during a plurality of time periods represented by the validation data;
determining a plurality of validation disparity measures by comparing the first measure to the plurality of validation measures; and
repeating the pruning until the plurality of validation disparity measures exceeds a validation threshold with no more than a threshold frequency.

5. The computer-implemented method of claim 1, further comprising:
generating the reference data by:
(i) obtaining a plurality of reference data subsets by obtaining each respective reference data subset of the plurality of reference data subsets from a corresponding computing device subset of the plurality of computing devices that is associated with a corresponding training combination of a plurality of training values of the plurality of attributes; and
(ii) determining, for each respective reference data subset of the plurality of reference data subsets, a corresponding rate at which respective computing devices of the corresponding computing device subset enter the first device state, wherein training the machine learning model comprises training the machine learning model to approximate the corresponding rate based on the corresponding training combination of the plurality of training values of the plurality of attributes.

6. The computer-implemented method of claim 1, further comprising:
generating the reference data by:
(i) obtaining a plurality of reference data subsets by obtaining each respective reference data subset of the plurality of reference data subsets from a corresponding computing device subset of the plurality of computing devices that is associated with a corresponding training combination of a plurality of training values of the plurality of attributes; and
(ii) selecting, for each respective reference data subset of the plurality of reference data subsets, a corresponding classification from a plurality of predefined classifications by comparing (a) a corresponding rate at which respective computing devices of the corresponding computing device subset enter the first device state to (b) a threshold rate, wherein training the machine learning model comprises training the machine learning model to approximate the corresponding classification based on the corresponding training combination of the plurality of training values of the plurality of attributes.

7. The computer-implemented method of claim 1, wherein determining the combination of the plurality of values comprises:
selecting the combination of the plurality of values from two or more combinations of the plurality of values of the plurality of attributes, wherein the selecting of the combination of the plurality of values is based on an extent of correlation of each respective combination of the two or more combinations with entry into the first device state, and wherein the extent of correlation of each respective combination is indicated by the machine learning model.

8. The computer-implemented method of claim 1, wherein the combination of the plurality of values defines an order of two or more attributes of the plurality of attributes, wherein the order defines a relative correlation of each attribute of the two or more attributes with entry into the first device state, and wherein generating the indication comprises generating a representation of the order.

9. The computer-implemented method of claim 1, wherein a first attribute of the plurality of attributes comprises a first value that forms part of the combination of the plurality of values and a second value, and wherein, after the training, the machine learning model is configured to indicate that (i) the first value, when associated with at least one computing device, is correlated with the at least one computing device entering the first device state and (ii) the second value, when associated with the at least one computing device, is correlated with the computing device avoiding the first device state.

10. The computer-implemented method of claim 1, wherein:
determining the combination of the plurality of values comprises determining a plurality of combinations of the plurality of values;
selecting the first computing device subset comprises selecting a plurality of computing device subsets from the plurality of computing devices such that, for each respective computing device subset of the plurality of computing device subsets, a respective combination of the plurality of combinations (i) corresponds to the respective computing device subset and (ii) is associated with each respective computing device of the respective computing device subset;
determining the first measure comprises, for each respective computing device subset of the plurality of computing device subsets, determining, based on a respective reference data subset that corresponds to the respective computing device subset, a corresponding first measure indicative of a corresponding first rate at which computing devices of the respective computing device subset have entered the first device state during the first time period represented by the respective reference data subset;
determining the second measure comprises, for each respective combination of the plurality of combinations, determining, based on respective production data corresponding to respective one or more computing devices associated with the respective combination, a corresponding second measure indicative of a corresponding second rate at which the respective one or more computing devices have entered the first device state during the second time period represented by the respective production data;
generating the indication comprises:
(i) determining, for each respective combination of the plurality of combinations, a respective disparity measure by comparing the corresponding first measure to the corresponding second measure; and
(ii) generating, based on the respective disparity measure for each respective combination of the plurality of combinations, one or more indications that the corresponding second rate differs from the corresponding first rate by more than the predefined threshold amount.

11. The computer-implemented method of claim 1, wherein the first device state of a computing device of the plurality of computing devices represents an abnormal device state in which one or more systems associated with the computing device operate abnormally.

12. The computer-implemented method of claim 1, wherein the first time period represents operation of the first computing device subset before a change in one or more values of one of more attributes of the plurality of attributes, and wherein the second time period represents operation of the one or more computing devices after the change in the one or more values of the one of more attributes.

13. The computer-implemented method of claim 12, wherein the change in the one or more values of the one of more attributes is caused by release of an update to one or more subsystems associated with the plurality of computing devices.

14. The computer-implemented method of claim 1, wherein the first measure comprises a first parameter of a first statistical distribution that represents the first rate, wherein the second measure comprises a second parameter of a second statistical distribution that represents the second rate, and wherein the comparison of the first measure to the second measure comprises determining a disparity measure that represents a disparity between the first statistical distribution and the second statistical distribution.

15. The computer-implemented method of claim 1, wherein the plurality of computing devices comprise a plurality of media presentation devices.

16. The computer-implemented method of claim 1, wherein the indication that the second rate differs from the first rate by more than the predefined threshold amount comprises an identification of at least one of (i) the computing devices of the first computing device subset or (ii) the one or more computing devices associated with the combination of the plurality of values.

17. A system comprising:
- a processor; and
- a non-transitory computer-readable medium having stored thereon instructions that, when executed by the processor, cause the processor to perform operations comprising:
  - determining a combination of a plurality of values of a plurality of attributes represented by reference data associated with a plurality of computing devices by training a machine learning model based on the reference data, wherein the reference data contains an association between (i) respective values of the plurality of attributes and (ii) the plurality of computing devices entering a first device state of a plurality of possible device states, and wherein the combination of the plurality of values is correlated with entry into the first device state;
  - selecting at least a first computing device subset from the plurality of computing devices such that each respective computing device of the first computing device subset is associated with the combination of the plurality of values;
  - determining, based on a first reference data subset of the reference data, at least a first measure indicative of a first rate at which computing devices of the first computing device subset have entered the first device state during a first time period represented by the first reference data subset, wherein the first reference data subset corresponds to the first computing device subset;
  - determining, based on production data corresponding to one or more computing devices associated with the combination of the plurality of values, at least a second measure indicative of a second rate at which the one or more computing devices have entered the first device state during a second time period represented by the production data; and
  - generating, based on a comparison of the first measure to the second measure, an indication that the second rate differs from the first rate by more than a predefined threshold amount.

18. The system of claim 17, wherein at least part of a structure of the machine learning model that results from the training represents the combination of the plurality of values, and wherein a representation of the combination of the plurality of values by the structure of the machine learning model is human-interpretable.

19. The system of claim 18, wherein the machine learning model comprises a decision tree model, and wherein the combination of the plurality of values is represented by a hierarchy of a plurality of nodes of the decision tree model resulting from the training.

20. A non-transitory computer-readable medium having stored thereon instructions that, when executed by a computing device, cause the computing device to perform operations comprising:
- determining a combination of a plurality of values of a plurality of attributes represented by reference data associated with a plurality of computing devices by training a machine learning model based on the reference data, wherein the reference data contains an association between (i) respective values of the plurality of attributes and (ii) the plurality of computing devices entering a first device state of a plurality of possible device states, and wherein the combination of the plurality of values is correlated with entry into the first device state;
- selecting at least a first computing device subset from the plurality of computing devices such that each respective computing device of the first computing device subset is associated with the combination of the plurality of values;
- determining, based on a first reference data subset of the reference data, at least a first measure indicative of a first rate at which computing devices of the first computing device subset have entered the first device state during a first time period represented by the first reference data subset, wherein the first reference data subset corresponds to the first computing device subset;
- determining, based on production data corresponding to one or more computing devices associated with the combination of the plurality of values, at least a second measure indicative of a second rate at which the one or more computing devices have entered the first device state during a second time period represented by the production data; and
- generating, based on a comparison of the first measure to the second measure, an indication that the second rate differs from the first rate by more than a predefined threshold amount.

\* \* \* \* \*